Sept. 25, 1962   W. H. PITTS, JR   3,055,475
ELECTROMAGNETIC DRIVE
Filed Dec. 19, 1958   2 Sheets-Sheet 1

INVENTOR
Wade H. Pitts, Jr.
BY
Blair, Spencer + Buckles
ATTORNEYS

Sept. 25, 1962 W. H. PITTS, JR 3,055,475
ELECTROMAGNETIC DRIVE
Filed Dec. 19, 1958 2 Sheets-Sheet 2

INVENTOR
Wade H. Pitts, Jr.
BY
Blair, Spencer + Buckles
ATTORNEYS

United States Patent Office 3,055,475
Patented Sept. 25, 1962

3,055,475
ELECTROMAGNETIC DRIVE
Wade H. Pitts, Jr., % Electro-Lock, Inc., U.S. Clutch Division, 171 Neil St., Memphis, Tenn.
Filed Dec. 19, 1958, Ser. No. 781,777
10 Claims. (Cl. 192—84)

This invention relates to improvements in rotatable magnetic drive members, and more particularly to frictionally engageable electromagnetic clutches and brakes. The invention is directed to a solution of the problem of heat generation between rapidly rotating frictionally engageable magnetic members, and to substantial elimination of the deleterious effects known in the art as "warping," "coning" or "dishing" which normally result from heat differentials between different portions of such members when engaged or disengaged at high rotational speeds.

The invention is particularly adapted for disc type magnetic clutches wherein two annular members are independently mounted for rotation about a common axis, and magnetic means associated with one member are adapted upon energization to attract relatively movable plane surfaces of both members into frictional engagement, whereby power may be transmitted from one rotating member to the other. To be effective as a clutch some slippage must occur between the surfaces of the two members during the initial period of engagement.

When the devices are driven at high speeds and under heavy loads, the friction which results between the two engaging surfaces during the initial period of engagement (while slippage is present) generates very substantial amounts of heat, approaching the melting temperature of the metal at the engaging surfaces. The heat thus generated causes unequal expansion between different parts of the metallic members, according to the abilities of the different parts to dissipate heat rapidly, and this unequal expansion distorts the otherwise plane clutching surface to produce the phenomena of warping or "dishing." The difference in diameter between the inner and outer peripheries of the clutch disc causes a differential in the engagement speeds of these different portions of the clutch surface, and a large ratio of outside diameter to inside diameter causes a large differential with resultant high heat generation. This heat generated physical distortion has long been a serious problem with all disc type clutches because the surface distortion prevents uniform or constant surface engagement between the clutch members, thereby reducing the torque capacity of the clutch as the members become heated. This reduction in torque capacity may further increase the slippage, thereby aggravating the heating condition and further reducing the effective torque between the clutch members.

This problem is even a more serious one in magnetic clutches than in conventional mechanical clutches of the disc type, because surface warping of the magnetic clutch surface introduces an undesirable air gap between portions of the two clutching surfaces, thereby increasing the reluctance of the magnetic circuit and producing a corresponding reduction in the magnetic attracting force which is intended to hold the surfaces in intimate engagement. Thus, not only is the driving friction reduced but also the magnetic force is reduced, and both of these deleterious effects tend further to increase the slippage, thereby generating more heat and further aggravating the undesirable effects.

The prior art approaches to this problem have included several techniques; the first to increase the ampere turns of the magnetizing coil in an effort to overcome the effects of warping by brute force; second, the employment of fins, fan blades or other means to induce a fluid flow (either liquid or air) about the heated parts to more rapidly dissipate the generated heat, and third, the addition of reinforcing ribs or other heavy mechanical structure to reduce the tendency of warping. All of these approaches have necessitated relatively large, heavy bulky and costly clutch structures, and the first technique also imposes a heavier drain on the battery or other current source by which the magnetic coil is energized.

These deleterious effects of frictionally generated heat, and the undesirable consequences thereof as above noted, are effectively eliminated by the present invention which, in a preferred embodiment as herein disclosed, provides an electromagnetic clutch of very small diameter, capable of rapid and repeated operation at much higher rotational speeds and under substantially heavier torque loads than has heretofore been possible even with substantially larger and heavier clutch structures.

Accordingly it is a general object of the invention to provide an improved frictional drive member wherein the undesirable effects of frictional heat are substantially eliminated. A further object is to provide such improvement in a rotatable magnetic drive member. Another object is to provide more efficient use of magnetizing forces in an electromagnetic torque drive. A more particular object of the invention is to provide an improved electromagnetic clutch structure which is capable of more rapid and repeated operation at substantially higher speeds and under substantially greater load conditions than has heretofore been permissible. A specific object of the invention is to achieve the above mentioned objects in a magnetic clutch structure which is of a more compact size and more economical construction than heretofore available.

Other objects and advantages of the invention will become apparent from the following detailed description taken in connection with the accompanying drawings in which.

Figure 1:
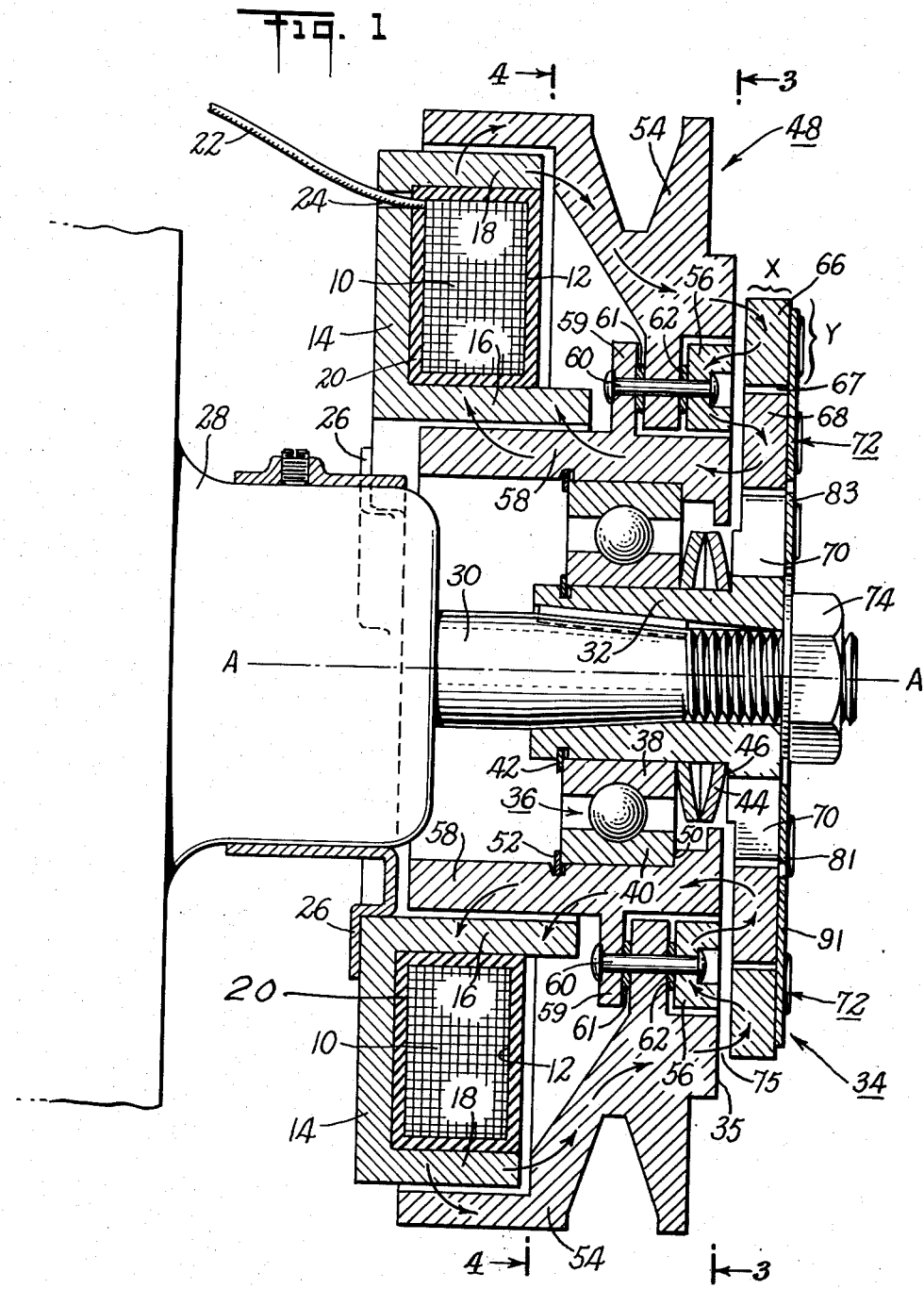
FIGURE 1 is an enlarged cross sectional view of a magnetic clutch structure according to a preferred embodiment of the invention, showing the structural elements as completely assembled.
Figure 5:
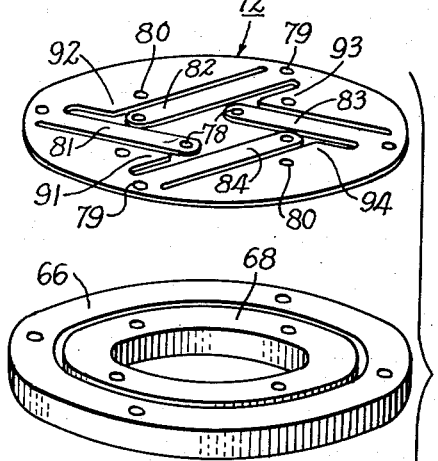
Figure 4:
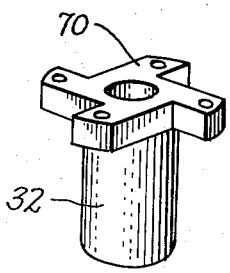
Figure 4:
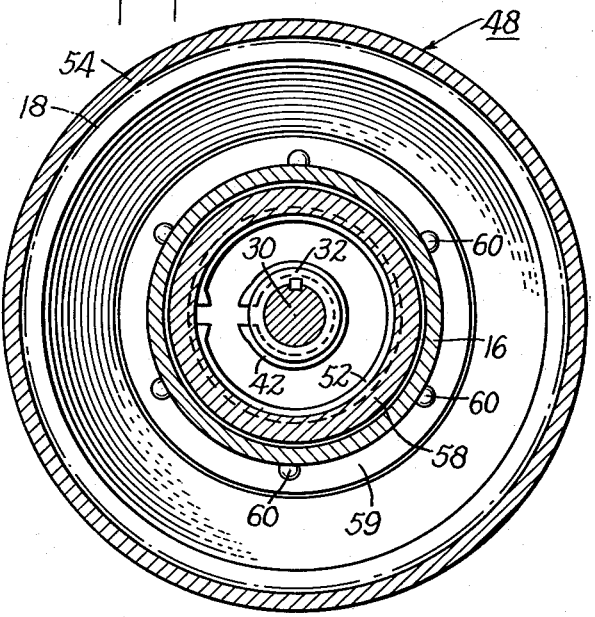

FIGURE 4 is an internal sectional view of the clutch pulley member taken along the line 4—4 of FIG. 1 showing the assembly of the pulley and its bearing upon the hub and shaft; and FIGURE 5 is an exploded view of the rotatable armature members from the clutch structure of FIG. 1, showing the hub, a pair of annularly spaced concentric magnetic armature rings, and the high reluctance, substantially non-magnetic, flexible spring by which the armature and hub are connected into a unitary operating assembly.

In general the objects of the invention, as embodied in the clutch shown in the drawings for illustrative purposes, are achieved by the combination of independently movable, resiliently mounted inner and outer annular magnetic discs having a very narrow continuous annular magnetic gap therebetween. The structure of the rotatable armature eliminates interconnecting magnetic spokes as heretofore employed between concentric magnetic members, by employing instead a semi-flexible resilient, substantially non-magnetic spring backing plate which serves the triple functions of maintaining a high reluctance magnetic path across a very narrow air gap between the concentric magnetic members, thus permitting a substantial reduction in the necessary diameter of the rotatable magnetic member, and at the same time affording a resilient connection between the two parts of the rotatable magnetic member whereby a useful degree of independent motion therebetween is obtained. The continuous air gap permitted by this construction provides a more effective heat insulation between the two concentric parts of the rotatable member, thereby increasing heat dissipation and reducing the tendency to warp, while at the same time permitting the requisite magnetic material to be encompassed within a substantially smaller diameter member, thereby reducing the inertia of this rotatable armature member and decreasing the tendency for slippage during initial frictional engagement, thus tending to reduce the generation of frictional heat. This construction also further reduces the tendency to warping, because the two resiliently mounted concentric parts of the rotatable magnetic armature member now have a smaller length to width (or diameter to thickness) ratio than was obtainable in the prior art structures, and hence the heat that is generated by friction is distributed through a more uniform mass, with a consequent substantial reduction in temperature differentials which have heretofore caused the undesirable effects of warping, dishing or coning.

A cooperating pair of continuous annular magnetic gaps are also provided in the clutching surface of the rotatable pulley member, by a substantially non-magnetic means of mounting an annular magnetic pole piece flush with but spaced from the magnetic pulley, as will be described more fully in reference to the drawings wherein corresponding parts are identified by like reference characters.

Referring now in greater detail to FIG. 1 of the drawings, it will be seen that the magnetic clutch of the preferred embodiment comprises a substantially toroidal energizing coil 10 having a substantially flat surface 12 normal to its axis A—A, and as shown in FIG. 1, being substantially rectangular in cross-section. Coil 10 is mounted in an annular recess of a low reluctance, highly permeable, magnetic ring member 14 which is substantially J-shaped in cross section, as shown in FIG. 1, having an inner magnetic extension 16 of somewhat longer dimension than its outer magnetic extension 18. It will be understood that annular magnetic extensions 16 and 18 are concentric about the common axis A—A, and that when the coil 10 is energized by passage of an electric current therethrough, magnetic lines of force are set up in the annular ring member 14, and the extensions 16 and 18 will assume either a north or south magnetic polarity, depending upon the direction of current flow through coil 10. The magnetic ring member 14 and its annular extensions 16 and 18 are preferably formed of a material having low magnetic retentivity, as well as low reluctance, so that the residual magnetization of extensions 16 and 18 drops to a low value upon interruption of current flow through coil 10. As shown in FIG. 1, coil 10 is preferably insulated from its adjacent magnetic members by a surrounding material 20 of suitable dielectric characteristics. A flexible insulated conductor 22 is brought out from one end of coil 10 through an opening 24 in the back of ring member 14, as shown in FIG. 1, while the other end of coil 10 may be grounded internally to ring member 14 whereby the coil energizing circuit may be completed through a ground return.

The magnetizing assembly, including coil 10 and its annular magnetic ring member 14, is affixed to a stationary support 28 by brackets 26—26 which may be spot welded or otherwise fastened to ring member 14 and supporting member 28. It will be understood that the brackets 26—26 may be formed to fit onto the casing of any apparatus which is to be driven through operation of the clutch. For example, support 28 may be the external casing of a compressor having a rotatable drive shaft 30, to the end of which is fastened a hub 32 carrying a rotatable armature indicated generally at 34. The hub 32 also carries a bearing 36, which is preferably a ball bearing as shown in FIG. 1, having inner and outer races 38 and 40, respectively. Inner race 38 of bearing 36 is positioned upon the hub 32 between a locking ring 42 and spring washer means 44 which may either be a pair of opposed spring washers as shown in FIG. 1 engaging annular shoulder 46 of hub 32, or a single spring washer such as a Belleville spring. The use of this form of spring support for the inner, or driven, race is preferred to the prior art technique of keying or splining the driven ball race to the hub, because of the comparative ease, speed and economy of assembly. Furthermore, this mode of construction permits a reduction in the mass of the hub, thereby reducing the starting inertia of the rotatable armature, with a consequent further reduction in slippage and frictional heat.

Outer bearing race 40 carries rotatable drive pulley 48 which is held in fixed axial relation thereto, concentric with axis A—A of rotatable shaft 30, between annular shoulder 50 of pulley 48 and locking ring 52. The rotatable drive pulley 48 is made up of three concentric members 54, 56 and 58, which are held together in a unitary structure by a plurality of annularly spaced rivets 60, which are preferably of stainless steel or other substantially non-magnetic material such as hard brass or bronze. Between the inner pulley member 58 and the outer pulley member 54 are a plurality of substantially non-magnetic spacers 61, which may be, for example, stainless steel or brass washers through which the rivets 60 are passed. A similar substantially non-magnetic spacer 62 is interposed between pulley members 54 and 56.

The rivets 60 are counter-sunk into the outside face of annular pulley member 56 to leave a plane clutching surface for frictional engagement with the corresponding inner plane surface of rotatable armature 34. All three concentric parts of pulley 48 are formed of highly permeable magnetic material, having low magnetic retentivity. The use of non-magnetic spacers 61 and 62 in the assembly of the several pulley members provides a continuous high reluctance separation between members 54, 56 and 58. While a solid non-magnetic filler material, such as brass, may be employed to maintain this separation between the magnetic members, I prefer to use annularly spaced stainless steel rivets and washers as shown, leaving a substantially uniform air gap between the pulley members 54, 56 and 58.

By this construction the outer pulley member 54 becomes a rotatable extension of stationary magnetic extension 18, inner pulley member 58 becomes a rotatable extension of extension 16; the pulley members 54 and 58 thus serve as poles or pole pieces for the coil 10. The annular ring member 56 is a rotatable "bridge" between but magnetically separated from these two extensions by the annular air gaps therebetween. The separately rotatable armature 34 is adapted to bridge these annular air gaps in the face of pulley 48, when the magnetizing coil 10 is energized, thereby providing a low reluctance magnetic shunt for the passage of magnetic flux lines as shown by the arrows in FIG. 1.

The construction and operation of armature 34 will now be described, with particular reference to FIGS. 1, 2, and FIG. 5 of the drawings. Referring first to the cross-sectional view of FIG. 1, the rotatable armature 34 comprises outer and inner annular armature members 66 and 68, separated from each other by annular air gap 67. Armature ring members 66 and 68 are supported upon rotatable hub flange 70 by means of a connecting non-magnetic leaf spring 72, as may be seen more clearly in FIG. 2 and FIG. 5. The completed armature assembly 34 is secured to rotatable shaft 30 by hex nut 74. When the clutch magnetizing coil 10 is de-energized, the armature 34 remains separated from the clutching surface 35 of pulley 48 by a substantially uniform air gap 75, the armature members 66 and 68 being normally held in this position by leaf spring 72. However, when the pulley pole members 54 and 58 are magnetized by energization of coil 10 then armature members 66 and 68 are attracted inwardly (to the left as viewed in FIG. 1) against the tension of leaf spring 72 and into intimate surface engagement with pulley clutching surface 35, thereby closing the gap 75 and magnetically shunting the annular air gaps between the magnetic pulley members 54, 56 and 58. In the engaged position the annular magnetic member 56 shunts the annular armature air gap 67 between armature members 66 and 68, thereby completing a low-reluctance path for magnetic flux to follow the course of the arrows in FIG. 1, passing from pulley member 54 into armature member 66, thence from armature member 66 back into pulley member 56, thence out into armature member 68, and finally back into pulley member 58. In this way a double re-entry magnetic path is created, the flux path being broken, or interrupted, four times in its passage between the pulley members and the armature. As each passage of flux between the pulley members and the armature produces a force of magnetic attraction proportional to the total flux flowing in the circuit, the re-entry series magnetic circuit shown in FIG. 1 provides substantially twice the magnetic attraction, for a given number of ampere-turns magnetizing force, as would otherwise obtain between the pulley pole members and a simple armature devoid of the annular air gap 67. It will be understood that while the preferred embodiment of the invention shown in the drawings provides merely a double re-entry, four-break series magnetic path, additional multiples of path breaks or re-entries may be provided within the scope of the invention by the expedient of employing additional annular air gaps or high reluctance magnetic barriers suitably disposed on the armature and the pulley.

Referring now in greater detail to FIG. 5 of the drawings, the form of leaf spring 72 may be seen to be a substantially flat disc having portions cut out to leave a plurality of elongated arms 81, 82, 83 and 84, each arm being pierced by a hole, such as 78—78, at its free extremity, and having another hole such as 79—79 at its fixed base adjacent the periphery of leaf spring 72. A corresponding plurality of substantially right-angular shoulder portions of leaf spring 72, designated in FIG. 5 as 91, 92, 93 and 94, are each pierced as at 80—80 to receive rivets for securing inner armature member 68. The outer armature member 66 is likewise secured by rivets to the outer peripheral holes 79—79 of leaf spring 72, while the hub flange 70 is riveted at holes 78—78 to the free ends of long spring arms 81—84. FIG. 2 is an end view of the completely assembled armature structure, showing the mounting rivets in place.

Figure 2:
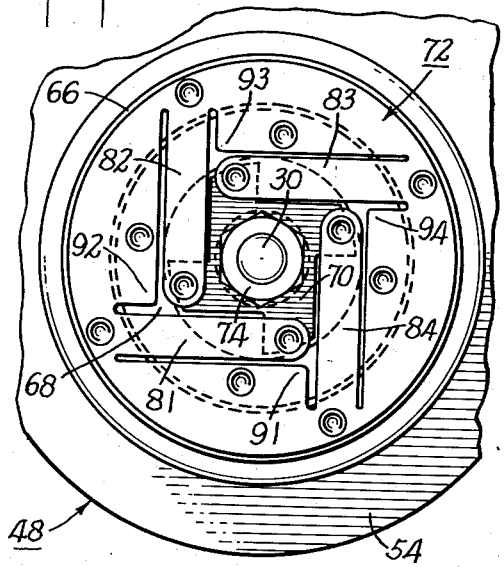
FIGURE 2 is an end view of the clutch in FIG. 1, drawn to a reduced scale and with a portion of the drive pulley broken away, showing the plan of spring leaves by which the several parts of the rotatable spring armature are held in an operating assembly.
Figure 3:
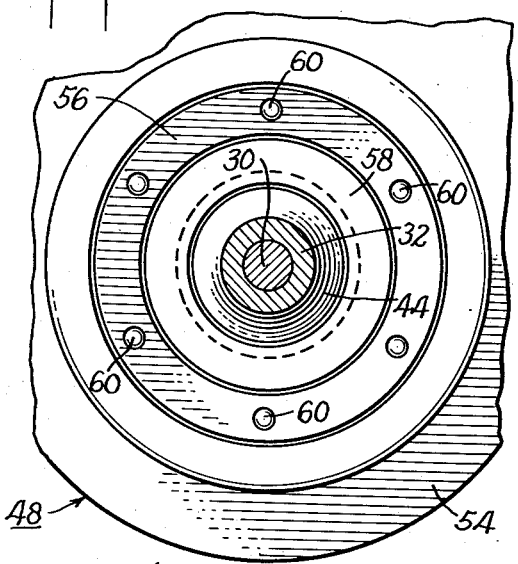
FIGURE 3 is a plan view taken along the line 3—3 of FIG. 1 showing the plurality of annular gaps in the clutching face of the drive pulley, with portions of the pulley flange broken away.

As mentioned hereinabove, the division of the rotatable armature, 34 (FIG. 1) into two air-separated concentric ring members, 66 and 68 as shown in FIG. 1, FIG. 2 and FIG. 5, not only permits a degree of independent movement between the two ring members, affording a greater degree of cooling therebetween and allowing for independent expansion and contraction through normal operating temperature changes, but also it reduces the dimensional differences between the radial diameter and the axial length of the rotatable armature, so that the frictional generated heat is distributed through a more uniform mass, actually through two separate masses whose cross-sectional dimensions are nearly equal in all directions. As shown in FIG. 1, the radial dimension Y of armature ring member 66 is only slightly greater than the axial dimension X, and the same is true of the second armature member 68, so that the heat generated in these two parts of the armature 34 is more uniformly distributed, and more uniformly dissipated, with the result that mechanical deformation of the armature through warping is effectively eliminated. In this way great structural rigidity is imparted to the rotatable armature without increasing its mass and inertia. Indeed, the invention enables the construction of a magnetic torque drive of much smaller physical dimensions and substantially lower unit mass and reduced rotational inertia, yet capable of transmitting high torque to heavy loads at substantially higher rotational speeds than has heretofore been possible. The provision of continuous annular air gaps in both the driving and driven members not only facilitates heat dissipation, but also assures most efficient utilization of the magnetizing forces by providing additional series breaks in the flux path between the engageable magnetic members, thus increasing the force of magnetic attraction therebetween.

It will thus be seen that there has been provided by this invention an improved electromagnetic torque drive in which the various objects hereinabove set forth, together with many thoroughly practical advantages, are successfully achieved. As many possible embodiments may be made of the above invention, and as many changes might be made in the embodiments above set forth, it is to be understood that all matter hereinbefore set forth or shown in the accompanying drawings is to be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Magnetically engageable torque drive means comprising in combination, a pair of concentric low-retentivity high-permeability magnetic pole pieces rotatable as a unit about a common axis, means for unitarily driving said pole pieces in rotation about said axis, means for inducing a magnetic field between said pole pieces, an annular magnetic member of low-reluctance highly permeable material mounted to said pole pieces by substantially non-magnetic mounting means, said mounting providing continuous annular separation between both of said pole pieces and said annular magnetic member, a surface of said magnetic annular member lying in a common plane with surfaces of both of said pole pieces, a pair of concentric annular magnetic armature members, substantially non-magnetic resilient spring means jointly mounting both of said armature members for rotation as a unit about said common axis in proximity to but independently of said common pole piece surface plane, and means including said substantially non-magnetic spring mounting for maintaining continuous annular separation between both of said armature members whereby magnetic flux entering one of said armature members from one of said pole pieces is induced to flow into said annular magnetic member and thence into the other of said armature members before entering the other of said pole pieces.

2. A pair of magnetically engageable rotatable drive members comprising in combination, a pair of unitarily rotatable concentric magnetic pole pieces, at least one annular member of high permeability and low retentivity magnetic material concentrically mounted between said pole pieces and magnetically isolated therefrom by a substantially uniform non-magnetic high reluctance gap, said pole pieces and said annular member having radially spaced surfaces forming a first clutching surface, means mounting said pole pieces and annular member for rotation as a unit about a common axis, electromagnetic means energizable to induce magnetic lines of force in said pole pieces, a rotatable armature including a pair of radially spaced concentric rings of magnetic material having high permeability and low retentivity mounted for unitary rotation about said axis, a second clutching surface on said armature magnetically engageable with said first clutching surface upon the energization of said electromagnetic means, and resilient spring means of high magnetic reluctance joining said radially spaced armature rings to maintain continuous radial separation therebetween while permitting limited relative axial motion of one of said armature rings with respect to the other.

3. Magnetically engageable drive means, comprising, in combination, a pair of unitarily rotatable magnetic pole pieces, an annular member of highly permeable material disposed between said pole pieces and magnetically separated therefrom by a relatively high reluctance gap, a plane surface of said annular member lying in the same plane substantially contiguous with but separated from co-planar surfaces of both of said pole pieces, means mounting said pole pieces and annular member for rotation as a unit about a common axis, electromagnetic means fixedly mounted concentric with said pole pieces and said annular member and in magnetic proximity thereto, whereby magnetic lines of force are induced in said pieces and through said annular member upon energization thereof, means to energize said electromagnetic means, and substantially annular armature elements mounted on said common axis for limited relative axial movement with respect to each other and for unitary rotation about said axis, said armature elements being normally spaced from but magnetically engageable with said pole pieces and said annular member upon energization of said electromagnetic means.

4. The combination of claim 3 wherein said armature elements are a pair of concentric, radially spaced annular armature ring members of magnetically permeable material separated by a continuous annular gap of relatively high magnetic reluctance.

5. The combination of claim 4 including resilient spring means of relatively low magnetic permeability interconnecting said pair of armature ring members.

6. The combination of claim 5 including a fixed hub mounted for rotation about the same axis common to said rotatable pole pieces and in which said spring means interconnects said armature ring members with said fixed hub.

7. The combination of claim 6 including spring biased means normally holding said armature ring members spaced from but in close proximity to said pole pieces, whereby a multiple re-entry magnetic flux path is established between said pole pieces and said annular ring members, said magnetic flux path including at least four series passages through the space between said armature ring members and said pole pieces.

8. In an electromagnetic clutch, the combination comprising, a pair of rotatable magnetic poles having separate end members forming a common surface concentric with the axis of said pole rotation, means mounting a high-permeability, low-retentivity annular member rotatable about said axis between said poles concentric therewith and substantially uniformly spaced therefrom, electromagnetic means located with respect to said magnetic poles and said annular member to induce magnetic lines of force in said pieces and through said annular member upon energization thereof, a surface of said annular member being substantially contiguous with but separated from the common surface formed by said end members of said magnetic poles, means to energize said electromagnetic means, an armature of high permeability and low retentivity magnetic material flexibly divided into multiple portions, said armature being concentrically mounted for rotation about the common axis of said poles and engageable therewith upon energization of said electromagnetic means, and means providing a continuous annular substantially non-magnetic separation between at least two of said portions, whereby magnetic flux from one of said poles upon entering one of said armature portions is induced to enter said annular member between said poles in order to gain access to the other of said armature portions and to enter the opposite magnetic pole.

9. An electromagnetic clutch, comprising, in combination, a first rotatable drive member having a pair of unitarily rotatable concentric pole pieces of magnetic material having high permeability and low retentivity, at least one annular member of high permeability and low retentivity magnetic material concentrically mounted between said pole pieces but magnetically isolated therefrom by a substantially uniform separator of non-magnetic high reluctance material, said annular member unitarily rotatable with said pole pieces and having a surface thereof lying in a common plane with adjacent annular surfaces of both of said pole pieces, means mounting said pole pieces and annular member for rotation as a unit about a common axis, electromagnetic means mounted in proximity to said pole pieces and energizable to induce magnetic lines of force therein, means to energize said electromagnetic means, a separately rotatable armature including a pair of annularly spaced concentric rings of magnetic material having high permeability and low retentivity mounted for unitary rotation about said axis, a substantially plane surface of said armature including adjacent surfaces of said spaced annular armature rings magnetically engageable with said common plane surface of said pole pieces upon energization of said electromagnetic means, a fixed hub rotatably mounted with respect to said pole pieces for independent rotation about said common axis, resilient spring means of relatively high magnetic reluctance joining said annular spaced armature rings to said fixed hub whereby said armature rings are rotatable as a unit about the same axis common to said pole pieces, said resilient spring means maintaining a continuous annular gap between said concentric armature rings while permitting limited relative axial motion of one ring with respect to the other when said armature rings are attracted into intimate magnetic engagement with said common plane surface of said pole pieces upon energization of said electromagnetic means, said resilient spring means normally holding said armature rings spaced from but in close proximity to said pole pieces whereby a multiple re-entry magnetic flux path is established between said pole pieces and said annular rings, said magnetic flux path including at least four series passages through the space between said armature rings and said pol pieces, means for driving said pole pieces in rotation about said common axis, and means for connecting a load to be driven to the hub of said rotatable armature, whereby upon energization of said electromagnetic means, said armature clutches said pole pieces to transmit rotational energy from said driving member to said armature.

10. An improved magnetically engageable drive assembly comprising, in combination, a driving member rotatable about a fixed axis, a plurality of concentric annular portions of high magnetic permeability in said driving member, said annular portions being radially spaced and substantially magnetically insulated from each other, each annular portion having a surface disposed in a common plane with a similar surface of each other such portion; a driven member having a plurality of concentric annular elements of high magnetic permeability, said annular elements of said driven member being radially spaced by a substantially continuous air gap and substantially magnetically insulated from each other, means mounting said elements of said driven member for unitary rotational movement about said axis and for limited relative axial movement with respect to each other, each annular element of said driven member having a surface disposed substantially in a common plane with a similar surface of each other element and positioned to complete a low reluctance series magnetic flux path through said portions and elements when said driven member is engaged with said driving member; an electromagnetic means having annular extensions positioned in close proximity to the radially outermost and innermost annular portions of said driving member, said electromagnetic means energizable to induce magnetic lines of force in series through said driving member portions and driven member elements whereby each of said driven member elements (References on following page)

engages two of said driving member portions to complete said magnetic flux path therethrough.

References Cited in the file of this patent

UNITED STATES PATENTS

| | | |
|---|---|---|
| 2,738,044 | Winther | Mar. 13, 1956 |
| 2,739,683 | Gamundi | Mar. 27, 1956 |
| 2,796,962 | Pierce | June 25, 1957 |
| 2,796,963 | Harter | June 25, 1957 |
| 2,919,777 | Walter | Jan. 5, 1960 |

FOREIGN PATENTS

| 533,180 | Canada | Dec. 13, 1956 |
|---|---|---|